United States Patent

[11] 3,575,342

[72] Inventor Louis M. Puster
Knoxville, Tenn.
[21] Appl. No. 835,087
[22] Filed June 20, 1969
[45] Patented Apr. 20, 1971
[73] Assignee Robertshaw Controls Company
Richmond, Va.

[54] THERMOSTATIC VALVE CONSTRUCTION AND THE LIKE
20 Claims, 4 Drawing Figs.

[52] U.S. Cl. ............................................. 236/34
[51] Int. Cl. ............................................. F01p 7/16
[50] Field of Search ............................ 236/34, 34.5, 92, 93, 99

[56] References Cited
UNITED STATES PATENTS

| | | | |
|---|---|---|---|
| 3,017,113 | 1/1962 | Drapeau | 236/34 |
| 3,237,862 | 3/1966 | Salerno et al. | 236/93 |
| 3,353,745 | 11/1967 | Beatenbough | 236/34 |
| 3,485,448 | 12/1969 | Coudriet | 236/34 |

*Primary Examiner*—Edward J. Michael
*Attorney*—Candor, Candor & Tassone

ABSTRACT: A thermostatic valve construction having a support means provided with a valve seat and a temperature-responsive device having a first part fixed to the support means and having a second part movable relative thereto in response to the temperature sensed by said device. A movable valve member opens and closes the valve seat. A first compression spring is disposed between the fixed part of the temperature-responsive device and the movable valve member to tend to move the valve member to its closed position and a second spring means is disposed between the valve member and the movable part of the temperature-responsive device to tend to move the valve member to its open position when the second spring means is under compression whereby the movable part of the temperature-responsive device is adapted to compress the second spring means a predetermined amount before causing the valve member to open in opposition to the force of the first spring means when the temperature-responsive device senses a predetermined temperature and a particular pressure differential exists across the valve member.

Patented April 20, 1971

INVENTOR.
LOUIS M. PUSTER

BY

HIS ATTORNEYS

THERMOSTATIC VALVE CONSTRUCTION AND THE LIKE

This invention relates to an improved thermostatic valve construction and the like.

It is well known from the U.S. Pat. No. 3,353,745, to Beatenbough, to provide a thermostatic valve construction that is compensated as to variations in pressure differential across the valve member thereof.

Accordingly, one of the features of this invention is to provide an improved automotive cooling system thermostat of the above type which will provide constant or level coolant temperature control regardless of vehicle speed and corresponding pump pressure variation.

The device of this invention therefore provides for a controlled reduction in start-to-open temperature as a result of increasing pump pressure whereas level control allows coolant temperature to be maintained at higher levels without imposing some of the problems normally encountered in high-temperature operations such as overboil at engine cutoff, etc. The high-temperature engine operation of this invention provides for a more efficient combustion of fuel and effectively reduces the amount of carbon pollution released to the atmosphere.

In particular, one embodiment of this invention provides a thermostatic valve construction having a support means provided with a valve seat therethrough. A temperature-responsive device has a first part fixed to the support means and has a movable part that moves relative to the support means in response to temperature sensed by the device. A movable valve member is provided for opening and closing the valve seat. A first compression spring means is disposed between the fixed part of the temperature-responsive device and the valve member to tend to always move the valve member to its closed position. A second compression spring is disposed between the valve member and the movable part of the temperature-responsive device to tend to move the valve member to its open position when the second spring is under compression. In this manner, the movable part of the temperature-responsive device is adapted to compress the second spring means a predetermined amount before overcoming the force of the first spring means and, thereby, causing the valve member to move in opposition to the force of the first spring to an open position thereof when the temperature-responsive device senses a predetermined temperature and a particular pressure differential exists across the valve member.

Accordingly, one of the objects of this invention is to provide an improved thermostatic valve construction having one or more of the novel features set forth above or hereinafter shown or described.

Another object of this invention is to provide an improved system utilizing such thermostatic valve construction or the like.

Other objects, uses and advantages of this invention are apparent from a reading of this description which proceeds with reference to the accompanying drawings forming a part thereof and wherein.

Figure 1:
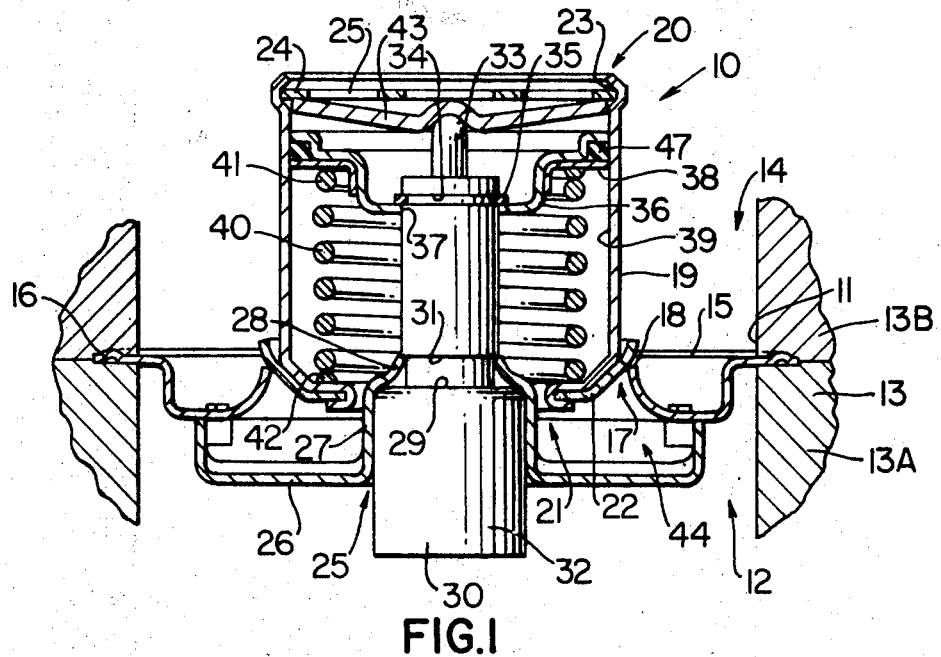
FIG. 1 is a cross-sectional view illustrating the thermostatic valve construction of this invention mounted in an automobile cooling system.

While the various features of this invention are hereinafter described and illustrated as being particularly adaptable for providing thermostatic means for an automotive coolant system, it is to be understood that the various features of this invention can be utilized singly or in any combination thereof to provide thermostatic valve means for other systems as desired.

Therefore, this invention is not to be limited to only the embodiments illustrated in the drawings, because the drawings are merely utilized to illustrate one of the wide variety of uses of this invention.

Referring now to FIG. 1, the improved thermostatic valve construction of this invention is generally indicated by the reference numeral 10 and is illustrated as being disposed across a passage means 11 that separates an inlet chamber means 12 of a housing means 13 from an outlet chamber means 14 thereof as is normally provided in an automotive coolant system or the like.

The thermostatic valve construction 10 comprises a support means 15 adapted to completely span the passage means 11 of the housing means 13 and has its outer peripheral means 16 secured and sealed between cooperating housing parts 13A and 13B as illustrated in FIG. 1 to completely seal closed the passage means 11 between the inlet 12 and outlet 14 thereof. However, the support means 15 has an opening 17 passing centrally therethrough to define a valve seat 18 adapted to be opened and closed by a valve member 19 of the valve construction 10 in a manner hereinafter described.

The valve member 19 of the valve construction 10 comprises a cylindrical tubular member having opposed open ends 20 and 21, the open end 21 being inwardly formed and reversely turned to hold an annular flange member 22 in crimped relation therewith for acting against the valve seat 18 as illustrated in FIG. 1 for opening and closing the same. The other open end 20 of the valve member 19 is provided with an annular, internal recess 23 which receives an end plate means 24 having suitable opening means 25 passing therethrough, the open end 20 being inwardly turned to hold the end plate 24 in fixed position in the tubular valve member 19.

The support means 15 carries a spiderlike retainer 26 having a central opening 25 passing therethrough and defining an upwardly directed tubular portion 27 adapted to be inwardly turned at its upper end 28 to abut against a shoulder means 29 of a conventional temperature-responsive device 30 telescopically disposed in the opening 25, the device 30 having another shoulder means 31 spaced from the first-named shoulder means 29 to also be abutted by the open end 28 of the retainer 26 whereby a first part 32 of the temperature-responsive device 30 is fixed to the support means 15. The temperature-responsive device 30 includes a movable piston part 33 which is adapted to be moved upwardly and downwardly relative to the fixed part 32 thereof in relation to temperature sensed by the device 30 in a conventional manner.

An annular groove 34 is provided in the fixed part 32 of the temperature-responsive device 30 adjacent its upper end with the annular groove 34 receiving a split retaining ring 35 to define another shoulder means of the fixed part 32 of the device 30.

A pistonlike spring retainer 36 has a central aperture 37 passing therethrough and telescopically receiving the upper reduced portion of the fixed part 32 of the temperature-responsive device 30 as illustrated in FIG. 1 so that the retainer 36 is limited in its upward movement relative to the fixed part 32 by abutting against the shoulder means 35 as illustrated. The retainer 36 includes an outwardly directed annular flexible sealing member 47 being carried thereby in any suitable manner, such as by a cooperating annular flange member 38 carried by the retainer 36 whereby the seal ring 47 is adapted to be disposed in sliding and sealing relationship with the inner peripheral cylindrical surface 39 of the valve member 19. In this manner, the retainer 36 seals the interior of the valve member 19 across the retainer 36.

A first compression spring 40 is disposed in the valve member 19 so as to have one end 41 thereof bear against the spring retainer 36 and the other end 42 thereof bear against the valve member 19 so that the force of the compression spring 40 tends to maintain the spring retainer 36 in abutting relation against the shoulder means 35 of the fixed part 32 of the temperature-responsive device 30 and tends to hold the valve member 19 in its seating position against the valve seat 18 to prevent fluid communication between the inlet 12 and outlet 14 of the housing means 13 as illustrated in FIG. 1.

A second compression spring means 43 is disposed in the valve member 19 between the fixed end plate 24 thereof and the movable part 33 of the temperature-responsive device 30. The second compression spring 43 comprises a spiderlike member that has a natural resiliency to be disposed in the unflattened position illustrated in FIG. 1 whereby in order to flatten the spider spring means 43 from its relaxed position of FIG. 1 to its fully compressed and flattened position of FIG. 2 against the end plate 24 of the valve member 19, the movable part 33 of the temperature responsive device 30 must move upwardly from the position illustrated in FIG. 1 to the position illustrated in FIG. 2 when the temperature-responsive device senses a predetermined temperature.

In view of the above description of the various parts of the thermostatic valve construction 10 of this invention, it can readily be seen that the thermostatic valve construction 10 can be made from a relatively few parts in a simple and economical manner to operate in a manner now to be described.

Since the pressure of the coolant fluid in the inlet chamber 12 acts through opening means 44 of the fixed spiderlike retainer 26 of the support means 15 against the under side of the valve member 19 at the valve seat 18 to tend to open the valve member 19 in opposition to the force of the compression spring 40, the compression force of the spring 40 can be so designed that the same will not allow the valve member 19 to unseat against any coolant pressure in the inlet chamber 12 less than the designated pressure which in a particular automotive coolant system is the maximum pressure of 35 p.s.i. developed by the vehicle pump in a conventional manner.

Figure 2:
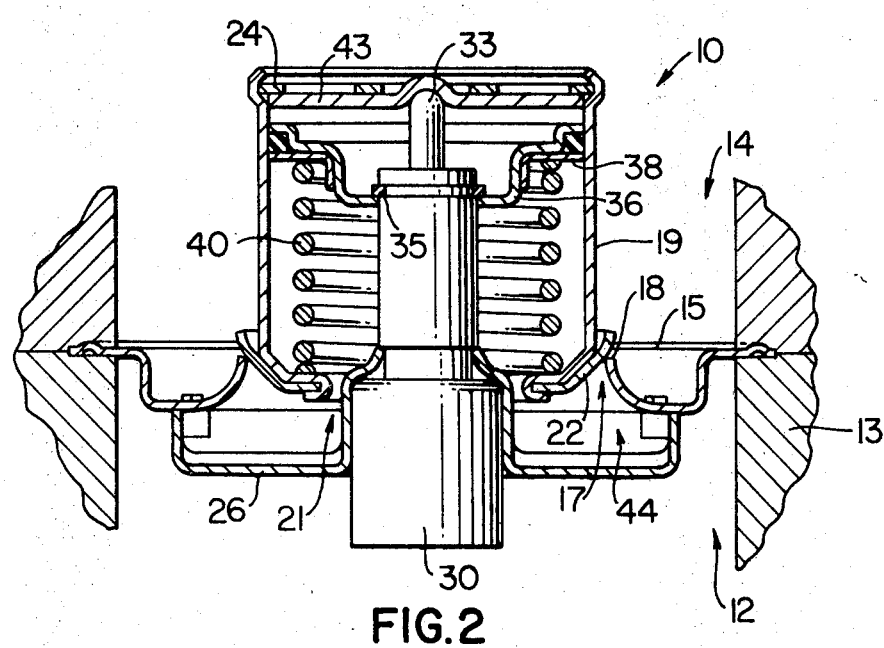
FIG. 2 is a view similar to FIG. 1 and illustrates one of the operating positions of the thermostatic valve construction of FIG. 1.
Figure 3:
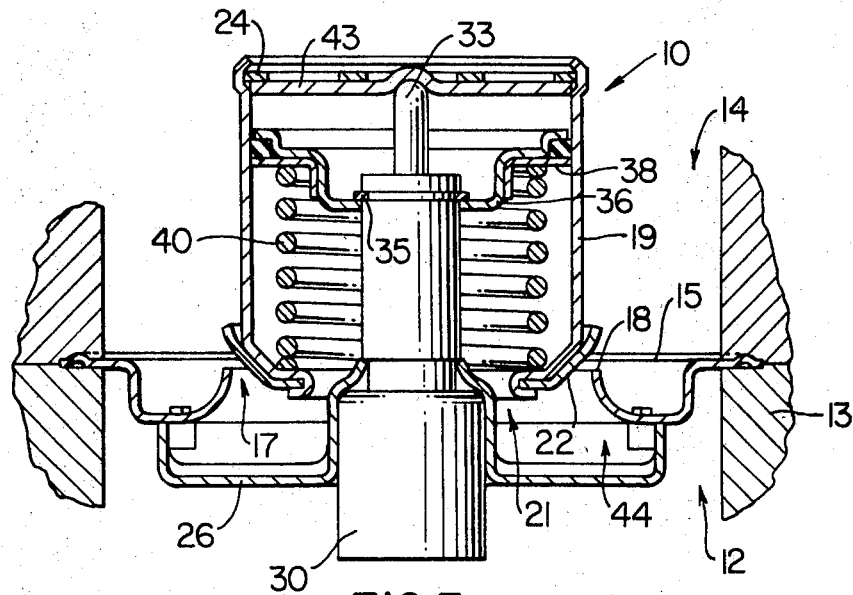
FIG. 3 is a view similar to FIG. 1 and illustrates another operating position of the thermostatic valve construction of FIG. 1.

However, as the coolant temperature in the inlet chamber 12 increases, it will cause the movable part 33 of the temperature-responsive device 30 to move upwardly to begin to flatten the spider spring 43 until the spider spring 43 is flattened against the end plate 24 which acts as a stop for the spider spring 43. Once the spider spring 43 has been flattened into contact with the plate means 24 of the valve member 19 as illustrated in FIG. 2, any further increase in coolant temperature will result in the opening of the valve member 19 in opposition to the force of the compression spring 40 from the position illustrated in FIG. 2 to the position illustrated in FIG. 3.

In this manner, normal, low-speed driving which results in low pump-coolant pressures allows the thermostatic valve construction 10 to act as a conventional, direct acting valve having a precalibrated temperature set point for opening thereof.

In particular, the valve seating load is the load of the compression spring 40 less the load required to flatten the spider spring 43 at the precalibrated opening temperature. Therefore, from the temperature at which the movable part 33 of the temperature-responsive device 30 begins to flatten the spider spring 43 until the normal (still water) opening temperature of the valve, the coolant pressure required to unseat the valve member 19 is a continually decreasing value.

Figure 4:
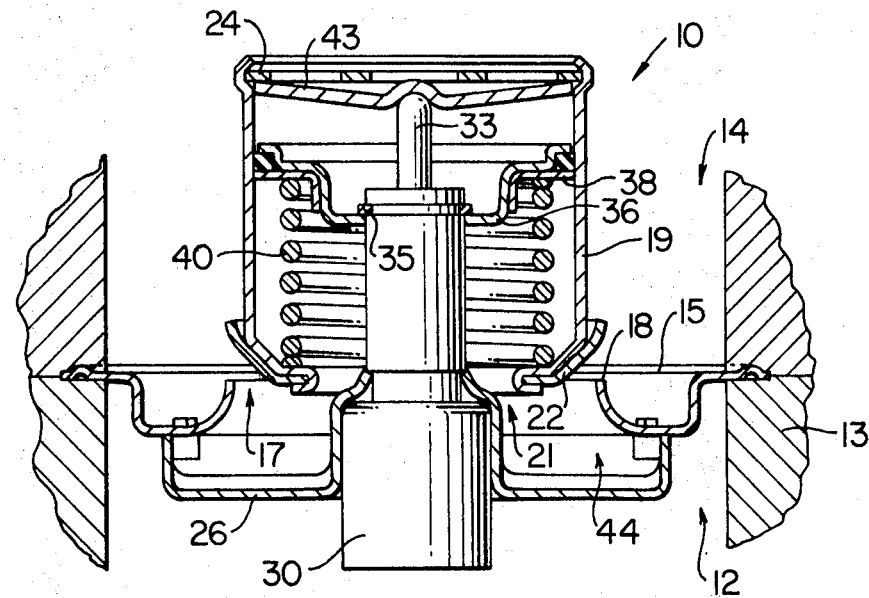
FIG. 4 is a view similar to FIG. 1 and illustrates still another operating position of the thermostatic valve construction of FIG. 1.

Thus, if a high coolant pressure occurs when the spider spring 43 is being flattened or in the process of being flattened by the movable part 33 of the temperature-responsive device 30, the resultant force due to the unbalance or pressure differential across the valve member 19 plus the spider spring load tending to open the valve member 19 are greater than the load of the spring 40 tending to maintain the valve member 19 in its closed position whereby the spider spring 43 will assume its free position which, in turn, lifts the valve member 19 off its valve seat 18 in the manner illustrated in FIG. 4 before the temperature sensed by the temperature-responsive device 30 reaches the previously described precalibrated set point temperature that normally causes opening of the valve member 19.

Since the operating or control temperature is a function of the valve opening, the above condition results in decreased operating temperature at high coolant pressures, thereby counteracting the increase in coolant temperatures normally occuring at high engine speeds. Thus, the thermostatic valve construction 10 of this invention results in a level control temperature regardless of engine speed and corresponding heat emission.

In view of the above, it can be seen that this invention provides an improved thermostatic valve construction as well as an improved system utilizing the same.

I claim:

1. A thermostatic valve construction comprising a support means having a valve seat, a temperature-responsive device having a first part fixed to said support means and having a second part movable relative to said support means in response to temperature sensed by said device, a movable valve member for opening and closing said valve seat, first compression spring means disposed between and against said first part of said device and said valve member to tend to move said valve member to its closed position, and second compression spring means disposed between and against said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member.

2. A thermostatic valve construction as set forth in claim 1 wherein said second spring means comprises a spider spring.

3. A thermostatic valve construction as set forth in claim 1 wherein said second spring means is adapted to bottom out against said valve member when said second spring means is compressed a certain amount.

4. A thermostatic valve construction as set forth in claim 1 wherein said first part of said temperature-responsive device carries an outwardly directed spring retainer, said first spring means having one end thereof bearing against said retainer.

5. A thermostatic valve construction comprising a support means having a valve seat, a temperature-responsive device having a first part fixed to said support means and having a second part movable relative to said support means in response to temperature sensed by said device, a movable valve member for opening and closing said valve seat, first compression spring means disposed between said first part of said device and said valve member to tend to move said valve member to its closed position, and second compression spring means disposed between said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member, said first part of said temperature-responsive device carrying an outwardly directed spring retainer, said first spring means having one end thereof bearing against said spring retainer, said valve member having a cylinder portion, said spring retainer being disposed in said cylinder portion and sealing the same on opposite sides of said spring retainer.

6. A thermostatic valve construction as set forth in claim 5 wherein said spring retainer carries an annular sealing member bearing against said cylinder portion for said sealing purposes while permitting movement therebetween.

7. A thermostatic valve construction as set forth in claim 1 wherein said first part of said temperature-responsive device projects through said valve seat.

8. A thermostatic valve construction comprising a support means having a valve seat, a temperature-responsive device having a first part fixed to said support means and having a second part movable relative to said support means in response to temperature sensed by said device, a movable valve member for opening and closing said valve seat, first compression spring means disposed between said first part of said device and said valve member to tend to move said valve member to its closed position, and second compression spring means disposed between said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member, said first part of said temperature-responsive device having a shoulder means, said support means having an abutment means abutting said shoulder means to prevent movement of said first part of said temperature-responsive device in one direction relative to said support means.

9. A thermostatic valve construction as set forth in claim 8 wherein said first part of said temperature-responsive device has another shoulder means spaced from said first-named shoulder means, said first spring means effectively bearing against said second shoulder means to tend to prevent movement of said first part of said temperature-responsive device in the opposite direction to said one direction relative to said support means.

10. A thermostatic valve construction as set forth in claim 9 wherein a spring retainer is carried by said first part of said temperature-responsive device and is disposed between said first spring means and said second shoulder means.

11. In combination, a housing means having an inlet chamber and an outlet chamber interconnected together by a passage means, a thermostatic valve construction carried by said housing means and having a support means spanning said passage means, said support means having a valve seat for interconnecting said inlet chamber with said outlet chamber, a temperature-responsive device having a first part fixed to said support means and having a second part movable relative to said support means in response to temperature sensed by said device, a movable valve member for opening and closing said valve seat, first compression spring means disposed between and against said first part of said device and said valve member to tend to move said valve member to its closed position, and second compression spring means disposed between and against said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member.

12. A combination as set forth in claim 11 wherein said second spring means comprises a spider spring.

13. A combination as set forth in claim 11 wherein said second spring means is adapted to bottom out against said valve member when said second spring means is compressed a certain amount.

14. A combination as set forth in claim 11 wherein said first part of said temperature-responsive device carries an outwardly directed spring retainer, said first spring means having one end thereof bearing against said retainer.

15. In combination, a housing means having an inlet chamber and an outlet chamber interconnected together by a passage means, a thermostatic valve construction carried by said housing means and having a support means spanning said passage means, said support means having a valve seat for interconnecting said inlet chamber with said outlet chamber, a temperature-responsive device having a first part fixed to said support means and having a second part movable relative to said support means in response to temperature sensed by said device, a movable valve member for opening and closing said valve seat, first compression spring means disposed between said first part of said device and said valve member to tend to move said valve member to its closed position, and second compression spring means disposed between said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member, said first part of said temperature-responsive device carrying an outwardly directed spring retainer, said first spring means having one end thereof bearing against said spring retainer, said valve member having a cylinder portion, said spring retainer being disposed in said cylinder portion and sealing the same on opposite sides of said spring retainer.

16. A combination as set forth in claim 15 wherein said spring retainer carries an annular sealing member bearing against said cylinder portion for said sealing purposes while permitting movement therebetween.

17. A combination as set forth in claim 11 wherein said first part of said temperature-responsive device projects through said valve seat.

18. In combination, a housing means having an inlet chamber and an outlet chamber interconnected together by a passage means, a thermostatic valve construction carried by said housing means and having a support means spanning said passage means, said support means having a valve seat for interconnecting said inlet chamber with said outlet chamber, a temperature-responsive device having a first part fixed to said support means and having a second part movable relative to said support means in response to temperature sensed by said device, a movable valve member for opening and closing said valve seat, first compression spring means disposed between said first part of said device and said valve member to tend to move said valve member to its closed position, and second compression spring means disposed between said valve member and said second part of said device to tend to move said valve member to its open position when said second spring means is under compression, said second part of said device being adapted to compress said second spring means a predetermined amount before causing said valve member to open in opposition to the force of said first spring means when said device senses a predetermined temperature and a particular pressure differential exists across said valve member, said first part of said temperature-responsive device projecting through said valve seat, said first part of said temperature-responsive device having a shoulder means, said support means having an abutment means abutting said shoulder means to prevent movement of said first part of said temperature-responsive device in one direction relative to said support means.

19. A combination as set forth in claim 18 wherein said first part of said temperature-responsive device has another shoulder means spaced from said first-named shoulder means, said first spring means effectively bearing against said second shoulder means to tend to prevent movement of said first part of said temperature-responsive device in the opposite direction to said one direction relative to said support means.

20. A combination as set forth in claim 19 wherein a spring retainer is carried by said first part of said temperature-responsive device and is disposed between said first spring means and said second shoulder means.